United States Patent [19]

Gaillard et al.

[11] Patent Number: 5,530,071
[45] Date of Patent: Jun. 25, 1996

[54] PREPARATION OF IMIDE-MODIFIED METHYL METHACRYLATE (MMA) POLYMER/COPOLYMERS

[75] Inventors: Patrice Gaillard, Souchez; Philippe Heim; Stephane Nowe, both of Pau, all of France

[73] Assignee: Elf Atochem S.A., Puteaux, France

[21] Appl. No.: 199,708

[22] Filed: Feb. 22, 1994

Related U.S. Application Data

[62] Division of Ser. No. 101,758, Aug. 4, 1993, Pat. No. 5,340,882.

[30] Foreign Application Priority Data

Aug. 4, 1992 [FR] France ................. 92 09650

[51] Int. Cl.$^6$ ........................................... C08F 8/32
[52] U.S. Cl. ...................... 525/330.5; 525/377.6; 525/378; 525/379
[58] Field of Search ................ 528/327.6, 330.5

[56] References Cited

U.S. PATENT DOCUMENTS

| 3,244,679 | 4/1966 | Schroder et al. | 525/330.5 |
| 3,284,425 | 11/1966 | Schroder et al. | 525/330.5 |
| 4,246,374 | 1/1981 | Kopchik . | |
| 5,046,968 | 3/1992 | Sasaki et al. | 525/330.5 |
| 5,126,409 | 6/1992 | Jevesson et al. | 525/330.5 |

FOREIGN PATENT DOCUMENTS

| 0203724 | 3/1986 | European Pat. Off. . |
| 216505 | 4/1987 | European Pat. Off. . |
| 275918 | 4/1988 | European Pat. Off. . |
| 315151 | 5/1989 | European Pat. Off. . |
| 315149 | 5/1989 | European Pat. Off. . |
| 200530 | 7/1989 | European Pat. Off. . |
| 331052 | 9/1989 | European Pat. Off. . |
| 0441148A2 | 8/1991 | European Pat. Off. . |
| 2393818 | 5/1979 | France . |
| 1165861 | 10/1964 | Germany . |
| 4002904 | 8/1991 | Germany . |
| WO91/09886 | 7/1991 | WIPO . |

Primary Examiner—Bernard Lipman
Attorney, Agent, or Firm—Burns, Doane, Swecker & Mathis

[57] ABSTRACT

Imidation-modified MMA (co)polymers, characteristically having a Tg from 20° to 30° C. higher than the Tg of the corresponding unmodified MMA (co)polymer, are produced by reacting an amine, e.g., methylamine or cyclohexylamine, with a suspension, in a hydrophobic nonsolvent reaction medium, of beads of such MMA polymer/copolymer.

2 Claims, 1 Drawing Sheet

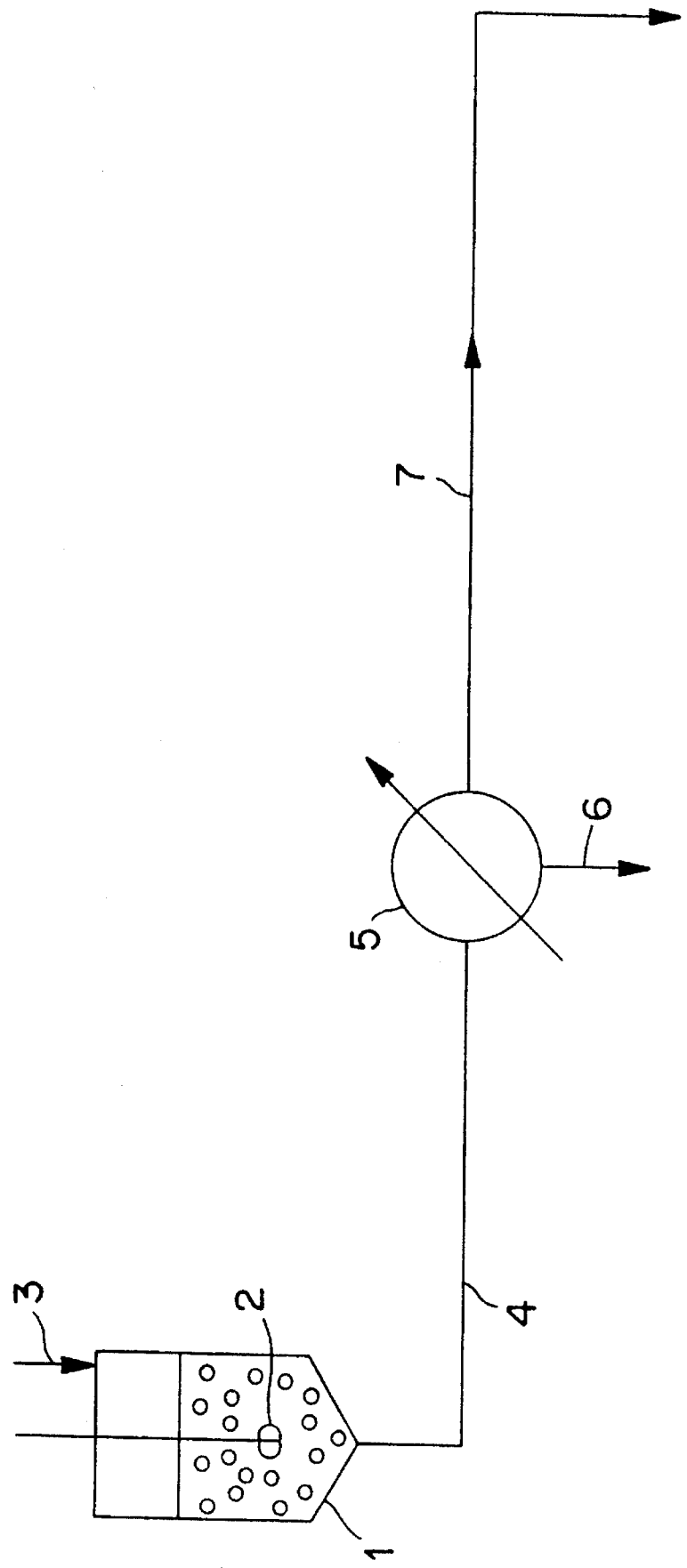

PREPARATION OF IMIDE-MODIFIED METHYL METHACRYLATE (MMA) POLYMER/COPOLYMERS

This application is a divisional, of application Ser. No. 08/101,758, filed Aug. 4, 1993 U.S. Pat. No. 5,340,882.

BACKGROUND OF THE INVENTION

1. Field of the Invention

The present invention relates to the preparation of polymers or copolymers based on methyl methacrylate (MMA) which are modified by imidation, via reaction with an amine, of the ester functional groups comprising same, to improve various properties thereof.

This invention also relates to such imidation-modified polymers or copolymers based on MMA, per se.

2. Description of the Prior Art

It is known to this art to produce polymers based on MMA via imidation using an amine, for example by imidation:

(a) of molten polymer in an extruder, (b) of polymer dissolved in a solvent, and (c) of polymer in suspension in aqueous phase.

These processes present a number of disadvantages. Thus, the aforenoted processes for imidation in molten state present the disadvantage of poor control and heterogeneity of the imidation, by reason of a reaction between the highly viscous molten polymer and a gas (for example methylamine), a reaction which must be carried out in a very short time (3 to 5 min residence time in the extruder). They also present the disadvantage of heterogeneity of temperature within the molten polymer.

Homogeneous phase processes in a solvent medium present the disadvantage of requiring a costly devolatilization and, in addition, of producing polymers or copolymers containing higher proportions of carboxylic or anhydride functional groups.

Aqueous suspension processes present the disadvantage that the reaction proceeds through a stage of dissolution of the beads or pearls as a result of the formation of carboxylic functional groups, effecting a large increase in viscosity; the polymer reprecipitates only incompletely at the end of reaction. They also present the disadvantage of giving rise to high residual acid and amide contents and therefore producing a modified polymer or copolymer exhibiting poor optical and aging properties.

SUMMARY OF THE INVENTION

Accordingly, a major object of the present invention is the provision of an improved process for the preparation of imide-modified. MMA (co)polymers characterized by modification of the amine-swollen polymer in the form of micropearls in suspension in a hydrophobic nonsolvent (e.g., alkanes), which ensures (i) good control over the imidation content as a result of the duration of the reaction; (ii) a low acid or anhydride content; (iii) good control over the polymer temperature by virtue of the suspension in the fluid which regulates the temperature; and (iv) easy recovery of the products of imidation by spin drying without requiring a devolatilization operation.

Another object of the present invention is the provision of such imidation-modified MMA (co)polymers, per se, exhibiting good properties, especially transparency and resistance to aging and to chemical reagents.

Still another object of this invention is the provision of a modified PMMA which withstands a temperature of from 20° to 60° C. higher than that of the unmodified PMMA obtained by the processes of the prior art. Indeed, the modified PMMA thus prepared has a glass transition temperature (Tg) higher than that of the standard PMMAs.

Another object of this invention is the provision of a process for the production of imidation-modified MMA polymers/copolymers that is less costly than those techniques requiring a solvent evaporation stage and which affords better control over the imidation content than that of the process conducted in an extruder.

Briefly, the present invention features a novel process for the preparation of polymers or copolymers based on MMA which are modified by imidation, via reaction with an amine, of the ester functional groups comprising same, said process including providing an MMA-based polymer or copolymer in the form of polymer/copolymer beads or pearls, and then conducting imidation of said pearls (beads), in suspension, in a hydrophobic nonsolvent medium therefor.

BRIEF DESCRIPTION OF THE DRAWING

The FIGURE of Drawing is a schematic/diagrammatic illustration of one embodiment of the process/apparatus for the preparation of the imide-modified MMA polymer/copolymers according to this invention.

DETAILED DESCRIPTION OF PREFERRED EMBODIMENTS OF THE INVENTION

More particularly according to the present invention, in one embodiment thereof the polymer beads have a mean diameter ranging from 10 to 1,000 µm, and preferably on the order of 100 to 700 µm.

In another embodiment of the invention, the imidation of the PMMA beads or pearls is carried out in situ, after a precipitating polymerization of the MMA in the hydrophobic nonsolvent medium in the form of said beads or pearls.

In yet another embodiment of the invention, the imidation is carried out directly after the precipitating polymerization.

In yet another embodiment of the invention, the imidation is carried out at a temperature ranging from 180° to 250° C.

Advantageously, the reaction medium is heated to the aforesaid temperature of imidation in successive plateaus.

Also advantageously, the reaction medium is heated to the aforesaid temperature of imidation continuously and slowly.

In another embodiment of the invention, the duration of the imidation reaction is on the order of 1 to 8 hours.

And in another embodiment of the invention, the hydrophobic nonsolvent medium of imidation is a $C_1$–$C_{12}$ alkane, preferably a $C_6$–$C_{10}$ alkane.

Indeed, since the imidation of the polymer beads according to the invention produces a modified PMMA exhibiting a Tg which is higher than that of standard PMMA, a heat-resistant PMMA is thereby provided, the Tg of which is a function of the intended end use of the modified PMMA. The modified polymer according to the invention has as few acidic groups as possible, the presence of these being responsible for polymer yellowing, giving rise to a higher awkward water uptake and, in general, requiring post-treatment.

In addition, it is also necessary that the amide content present in the modified PMMA thus obtained should not be high, in order to also avoid polymer yellowing.

The hydrophobic nonsolvent medium employed may be, inter alia, any alkane in which the number of carbon atoms is not too high to permit the removal of eventual trace amounts thereof from the modified PMMA during the processing, and in which the pearls are insoluble, while the MMA monomer is soluble therein. The $C_6$–$C_{10}$ alkanes, for example, are thus suitable.

In the event of the imidation of beads obtained beforehand, for example commercially available beads or beads prepared for the specific purpose of imidation according to the invention, these are placed in the form of a suspension in appropriate nonsolvent medium. Preferably, such beads are homopolymers or copolymers based on at least 80% MMA and on comonomers such as (meth)acrylic acid, alkyl acrylates, styrene, substituted styrenes and dienes, including butadiene. Copolymers of MMA and of ethyl or methyl acrylate, in which the proportions are on the order of 90% to 99% of MMA and from 10% to 1% of the acrylic comonomer are also particularly suitable. To provide a suitable suspension according to the invention, the amount of PMMA beads in the suspension is preferably less than or equal to 60% of the mixture in the form of suspension.

The imidation may be carried out in situ immediately after the precipitating polymerization which provides a suspension of fine particles in the nonsolvent medium. For this polymerization, a catalyst (for example a peroxide such as lauroyl peroxide) and a chain limiter (for example a mercaptan such as dodecyl mercaptan) are added to the hydrophobic medium which is a nonsolvent for PMMA and contains the MMA. These are heated to a temperature on the order of 80° C. to effect the precipitation of PMMA in the nonsolvent (as illustrated in Example 10 below).

Once the PMMA beads or pearls are in suspension in the nonsolvent, whether they be obtained commercially or prepared by precipitation in situ, a suspending agent must be used to prevent the coalescence of the pearls at high temperature. Indeed, while there is no risk of setting solid when the operation is carried out at a temperature which is less than 130° C., setting occurs at a higher temperature if no suspending agent is employed, namely, in the case of a Tg from 20° C. to 30° C. higher than that of the Tg of the unmodified PMMA in accordance with the invention. Thus, any known suspending agent for stabilizing PMMA pearls in suspension in an alkane can be used, in particular a copolymer of nonyl acrylate or methacrylate and of MMA, comprising a proportion on the order of 70% to 95% of the acrylate or methacrylate. A copolymer of stearyl acrylate or methacrylate and of MMA is also suitable.

The amine used for the imidation reaction is any suitable primary amine whose boiling point is not too high, to avoid problems occurring during the processing of the modified polymer. The amine is any primary amine $RNH_2$, where R is a $C_1$–$C_{12}$ alkyl, $C_6$–$C_{11}$ cycloalkyl or $C_6$–$C_{10}$ aralkyl group. The preferred amines are methylamine or cyclohexylamine, with methylamine being very particularly preferred. It is also possible to use compounds which generate amines, for example urea.

The amount of amine which is added depends on the degree of imidation desired (and therefore on the Tg). The use of an excessively high proportion of amine can produce a yellow-colored PMMA, which is to be avoided. The amine may be introduced at the beginning, once only, continuously, or in a number of batches.

With methylamine, a polymer having imide and acidic functional groups is produced. The percentage of acid moieties is lower when the operation is carried out by the suspension process when compared with the prior process where the operation is carried out in solution (as shown by Examples 15 and 16 below).

With cyclohexylamine, a polymer having acidic, imide and amide functional groups is produced. The polymer may exhibit a yellow color due to the presence of the amide functions and therefore the use of cyclohexylamine is less favored for obtaining modified PMMA in accordance with the invention than the use of methylamine. However, these yellow-colored polymers are still acceptable because they can be easily treated with a dye and/or an optical brightener.

The nonsolvent/pearls/suspending agent/amine mixture is heated to carry out the subject imidation. In general, heating is carried out at a temperature above 150° C., preferably on the order of 180° to 250° C. The temperature must not be too high, to avoid yellowing of the resulting modified PMMA. The duration of treatment ranges from 1 to 8 hours (depending on the starting material employed) and preferably ranges from 1 to 5 hours.

The temperature increase may be performed either in successive plateaus or else continuously and slowly, as illustrative in the examples below.

The temperature and duration of the treatment are adjusted to provide the desired imide content (and consequently the Tg). Thus, for example, with ½ mol of amine per 1 mol of ester, and by operating at 210° C. for 3 hours, 40% of imide functional group is obtained (with methylamine).

In the case where, instead of operating on previously obtained beads, the operation is carried out by the process of imidation in situ after precipitating polymerization, the polymerization of the PMMA is carried out in the nonsolvent medium, as indicated above, then the amine and the suspending agent are added and the operation is carried out as in the case of the process described above employing a suspension of previously obtained pearls.

In another embodiment of the present invention, the amine initially employed is added in a single batch.

In still another embodiment of the invention, the amine initially employed is added in a number of batches.

In yet another embodiment of the invention, the amine initially employed is added continuously.

And in another embodiment of the invention, the suspending agent comprises a mixture of nonyl (methy)acrylate/MMA copolymer or stearyl (meth)acrylate/MMA copolymer.

The process of this invention is readily carried out in the apparatus shown in the attached FIGURE of Drawing.

In said FIGURE of Drawing, the subject process is illustrated as being carried out noncontinuously, albeit it is readily apparent that the process of the invention can be carried out continuously equally as well.

In said FIGURE of Drawing, an imidation reactor 1, contains a suspension of PMMA beads or pearls in an alkane. Such imidation reactor 1 is provided with stirring means 2, an amine injection conduit 3 and a conduit 4 for discharging the alkane suspension of the PMMA pearls after they have been subjected to the imidation reaction. The suspension subjected to said imidation is transferred via the conduit 4 to a vessel 5 for separating the nonsolvent by spin drying. The hydrophobic nonsolvent medium is recovered via the conduit 6 and can be recycled. The imide-containing beads are conveyed by the conduit 7 to a vessel (not shown) which permits the drying and the recovery of the imide-containing product thus obtained. The dried beads thus obtained can be converted by any suitable means into granules of modified PMMA which can be used for the manufacture of sheets or molded shaped articles.

In order to further illustrate the present invention and the advantages thereof, the following specific examples are given, it being understood that same are intended only as illustrative and in nowise limitative.

EXAMPLE 1

This example relates to the imidation of a suspension comprised of 70% by weight of a $C_{10}$ cut (decane) and 30% of previously synthesized PMMA pearls.

The decane cut to which 1% by weight (calculated in relation to the PMMA pearls) of a random copolymer containing 75% of nonyl methyacrylate and 25% of methyl methacrylate had been added was introduced into a pressure-resistant reactor.

PMMA pearls having a mean diameter of 600 μm were introduced, while stirring was continued. Finally, 0.5 mol of cyclohexylamine per 1 mol of ester was added.

The suspension was heated to 210° C. over 4 hours, maintained at this temperature for 2 hours and then cooled. The imide-containing pearls thus obtained were separated from the decane cut by spin drying, and then dried.

Infrared analysis evidenced that the polymer indeed had a methacrylimide structure containing imide, amide, acid and ester groups, as follows:

|  | Tg in °C. | % nitrogen | % acid | % imide | % amide | % ester |
| --- | --- | --- | --- | --- | --- | --- |
| Example 1 | 149 | 2.1 | 5 | 8 | 18 | 69 |

All of the % values were by weight.

EXAMPLE 2

The procedure of Example 1, was repeated, except that methylamine was employed instead of cyclohexylamine.

Infrared analysis evidenced a polymer of methacrylamide structure, but containing no amide groups.

|  | Tg in °C. | % nitrogen | % acid | % imide | % amide | % ester |
| --- | --- | --- | --- | --- | --- | --- |
| Example 2 | 133 | 3.5 | 2 | 33 | 0 | 65 |

EXAMPLES 3 TO 9

Various tests were carried out under conditions identical with those of Example 1. Only the nature of the amine, the temperature, and the duration of the temperature plateau were optionally modified.

The results are reported in Table I below:

TABLE I

|  | Nature of amine employed | Plateau T' (°C.) | Plateau duration (h) | Tg (°C.) | % nitrogen | % acid | % amide | % imide | % ester |
| --- | --- | --- | --- | --- | --- | --- | --- | --- | --- |
| Example 1 | cyclohexyl-amine | 210° | 2 | 149 | 2.1 | 5 | 18 | 8 | 69 |
| Example 2 | methyl-amine | 210° | 2 | 133 | 3.5 | 2 | 0 | 33 | 65 |
| Example 3 | cyclohexyl-amine | 210° | 3 | 154 | 2.6 | 6 | 28 | 11 | 55 |
| Example 4 | cyclohexyl-amine | 210° | 4 | 164 | 3.20 | 6 | 28 | 14 | 52 |
| Example 5 | methyl-amine | 210° | 3 | 135 | 3.5 | 2 | 0 | 35 | 63 |
| Example 6 | methyl-amine | 210° | 4 | 136 | 4.1 | 2 | 0 | 40 | 58 |
| Example 7 | methyl-amine | 220° | 2 | 133 | 3.9 | 2 | 0 | 38 | 57 |
| Example 8 | methyl-amine | 230° | 2 | 134 | 3.9 | 2 | 0 | 43 | 55 |
| Example 9 | methyl-amine | 170° | 2 | 119 | 2.6 | 3 | 0 | 23 | 75 |
|  |  | 190° | 2 |  |  |  |  |  |  |

Amine/ester molar ratio equal to 0.5.

EXAMPLE 10

This example relates to the precipitating polymerization producing a suspension of fine particles of PMMA in an alkane medium, followed by imidation in situ within the suspension.

A solution containing 30% of methyl methacrylate and 70% of hexane was introduced into a reactor. 0.5% of a random copolymer containing 75% of nonyl methacrylate and 25% of methyl methacrylate, 0.3% of tert-dodecyl mercaptan and 0.3% of lauroyl peroxide were added to the solution. The mixture was polymerized with stirring at 75° C.

The polymethyl methacrylate thus obtained was in the form of fine particles in suspension. When the polymerization was complete, 0.5 mol of methylamine per 1 mol of ester was introduced into the reactor and the materials were heated to 210° C. over 4 hours, and this was maintained for 2 hours. After cooling, the fine particles were separated from hexane by filtration and were dried.

Infrared analysis evidenced that the polymer had a methacrylimide structure containing imide, amide, acid and ester groups.

|  | Tg in °C. | % nitrogen | % acid | % imide | % amide | % ester |
|---|---|---|---|---|---|---|
| Example 10 | 132 | 3.4 | 2 | 34 | 0 | 64 |

EXAMPLE 11

The procedure of Example 1 was repeated, except that after 1 h, 30 min, of plateau at 210° C., 0.5 mol of cyclohexylamine was introduced over 30 minutes by means of a metering pump and that the plateau was extended by 2 hours. This addition of amine permitted production of highly imide-containing polymers while preserving the quality of stability of the suspension.

|  | Tg in °C. | % nitrogen | % acid | % imide | % amide | % ester |
|---|---|---|---|---|---|---|
| Example 11 | 186 | 4.9 | 7 | 25 | 39 | 29 |

EXAMPLE 12

The procedure of Example 11 was repeated, except for the use of methylamine instead of cyclohexylamine.

|  | Tg in °C. | % nitrogen | % acid | % imide | % amide | % ester |
|---|---|---|---|---|---|---|
| Example 12 | 143 | 4.9 | 2 | 55 | 0 | 43 |

EXAMPLES 13 AND 14

The procedure of Examples 11 and 12 was repeated, except that after 2 h, 30 min, of plateau at 210° C., 0.5 mol of amine was added, being introduced over 30 minutes, followed by 2 h, 30 min, of additional plateau at 220° C.

|  | Amine type | Tg in °C. | % nitrogen | % acid | % imide | % amide | % ester |
|---|---|---|---|---|---|---|---|
| Example 13 | cyclohexylamine | 188 | 6.3 | 6 | 66 | 27 | 1 |
| Example 14 | methylamine | 172 | 7 | 3 | 84 | 0 | 13 |

EXAMPLES 15 AND 16

These indicate a comparative example corresponding to a modification in suspension/solution.

The Table II below reports that modification of PMMA in suspension in a nonsolvent, when compared with the case of modification in solution in xylene, permits the production of polymers which were less rich in acid functions at identical imidation contents:

TABLE II

| Modification type | Amine type | Modification T' | % acid | % imide | % amide | % ester |
|---|---|---|---|---|---|---|
| Example 1 |  |  |  |  |  |  |
| in suspension | cyclohexylamine | 210° | 5 | 8 | 18 | 69 |
| in solution | cyclohexylamine | 210° | 10 | 10 | 31 | 49 |
| Example 2 |  |  |  |  |  |  |
| in suspension | methylamine | 210° | 2 | 34 | 0 | 65 |
| in solution | methylamine | 210° | 8 | 32 | 0 | 60 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. The imide-modified MMA polymer/copolymer prepared by a process, comprising reacting an amine with a suspension, in a hydrophobic nonsolvent reaction medium, of beads of said MMA polymer or copolymer, said imide-modified MMA polymer/copolymer having less than about 8% acid moeties.

2. The imide-modified MMA polymer/copolymer of claim 1 having a Tg from 20° to 30° C. higher than the Tg of the corresponding unmodified MMA polymer/copolymer.

* * * * *